United States Patent Office 3,564,030
Patented Feb. 16, 1971

3,564,030
PROCESS FOR MONO-ALKYLATION OF
AROMATIC COMPOUNDS
Eugene J. Miller, Jr., Wheaton, Ill., Ago Mais, Trenton, N.J., and Edgar S. Hammerberg, Chicago, Ill., assignors, by mesne assignments, to Armour Industrial Chemical Company, a corporation of Delaware
No Drawing. Continuation-in-part of application Ser. No. 451,021, Apr. 26, 1965. This application Oct. 30, 1967, Ser. No. 679,251
Int. Cl. C11c 1/00
U.S. Cl. 260—413
12 Claims

ABSTRACT OF THE DISCLOSURE

A process for mono-alkylation of aromatic compounds with unsaturated higher aliphatic compounds such as acids, amines, nitriles, esters, amides, and alcohols, in the presence of hydrofluoric acid to produce a high yield of products having mono-alkylation of the aromatic nucleus. The mono-alkylated products of this invention are useful as plasticizers, emulsifiers, and chemical intermediates.

CROSS REFERENCE TO RELATED APPLICATIONS

This application is a continuation-in-part of our copending application Ser. No. 451,021 filed Apr. 26, 1965, now abandoned.

BACKGROUND OF INVENTION

It has heretofore been proposed to alkylate aromatic compounds such as benzene, toluene, and naphthalene with unsaturated aliphatic compounds such as propylene, other lower olefins, and oleic acid using hydrofluoric acid as a condensing agent. As illustrative of such prior art, reference may be made to U.S. Pat. 2,275,312 and J. Am. Chem. Soc., 61, 1010–1015 (1939). As far as is known, however, no process of this kind has gone into commercial use, probably because of the relatively poor yields reported in the literature. This is especially true if it is desired to obtain high yields of mono-alkylated aromatic product, since processes of the above-cited references generally result in a high percentage of the product being polyalkylated. Further, the processes reported in the prior art require many hours, in the order of 16 to 24, to obtain the reported crude product yields. Heretofore, no process improvements have been proposed which are capable of producing high yields of mono-alkylated aromatic compounds formed by the above reactions. Especially, no improvements have been proposed which are capable of producing the mono-alkylated product in short periods of time to render the process commercially useable.

It is an object of this invention to provide an improved process for the mono-alkylation of aromatic carbocyclic compounds with an unsaturated higher molecular weight aliphatic compound. It is a further object of this invention to provide a process for mono-alkylation of aromatic compounds resulting in high yields in relatively short periods of time. It is still another object to provide a process which is adaptable for commercial application either as a batch or continuous process. Further objects and advantages will be seen in the following detailed description and examples.

The process of this invention is carried out in liquid hydrofluoric acid. If the reaction is to be conducted at temperatures above the boiling point of hydrofluoric acid, super-atmospheric pressure may be used to maintain the hydrofluoric acid as a liquid. As long as the hydrofluoric acid is maintained in the liquid state, it functions both as a catalyst for the reaction and as the reaction medium or solvent. It is possible to carry out the reaction over a broad range of temperatures from −20° to 100° C. However, it is preferable to conduct the reaction at a temperature within the range of from about 0° to 50° C.

The mono-alkylation process of this invention may be carried out on a wide variety of aromatic compounds such as benzene, naphthalene, anthracene compounds which may either be substituted or unsubstituted. Preferred aromatic compounds include mono-, di- and tri-carbocyclic compounds and their substituted derivatives wherein the substitution is from 1 to 2 radicals selected from the group consisting of methyl, methoxy, phenoxy, and hydroxy. A preferred sub-class of aromatic compounds includes mono- and di-carbocyclic compounds substituted with 1 to 2 methyl, methoxy, phenoxy, or hydroxy groups. An especially preferred sub-class of aromatic compounds includes the mono-carbocyclic compound benzene and benzene substituted with from 1 to 2 radicals selected from the group consisting of methyl, methoxy, phenoxy, and hydroxy groups. Preferred substituted compounds include toluene, anisole, phenol, phenylether, resorcinol, xylene, veratrole, cresol, naphthol, methylnapthalene, methoxynaphthalene, anthranol, and dimethylanthracene. Mixtures of such aromatic compounds may be used.

Substituted unsaturated aliphatic hydrocarbon compounds useful in the process of this invention include unsaturated aliphatic compounds having from 8 to 54 carbon atoms and at least one unsaturated or olefinic linkage. Substituents selected from the group consisting of acids, esters, alcohols, ethers, and nitrogen derivatives are suitable. Especially suitable nitrogen derivatives include amines, nitriles, and amides. Monomeric and polymeric unsaturated aliphatic compounds are suitable. One sub-class of preferred compounds includes substituted unsaturated aliphatic hydrocarbon monomeric compounds having from 8 to 22 carbon atoms. Unsaturated acids such as are obtained from animal or vegetable fats and oils are particularly suitable. Specifically preferred examples which may be used include oleic acid, 9-octadecenyl amine, erucic acid, unhydrogenated tallow, castor oil, linoleic acid, ricinoleic acid, 10-undecenoic acid, oleyl nitrile, oleyl alcohol, methyl oleate and oleylamide. Particularly desirable results have been obtained using oleic acid and its derivatives such as 9-octadecenyl amine and nitrile. Another sub-class of preferred compounds includes substituted unsaturated aliphatic hydrocarbon dimeric and trimeric compounds having from 22 to 54 carbon atoms. Substituents selected from the group consisting of acids, esters, alcohols, ethers, and nitrogen derivatives are suitable. The dimers from oleic acid and mixed acids such as found in natural oils such as tall oil are especially preferred. Mixtures of different substituted unsaturated aliphatic hydrocarbon compounds can be used, and other non-reacting saturated aliphatic compounds may be present.

The alkylation using 9-octadecenyl nitrile (oleylnitrile) presents a particular problem since the nitrile group is a reactive group. The process of this invention, however, promotes the desired mono-alkylation reaction and a minimum of undesired reaction between the nitrile and olefinic bonds. The previous processes have not been adapted to alkylation using an unsaturated compound having a reactive group such as the nitrile, relatively low yields having been obtained even when the reactant was olefinic acid.

The earlier work has been performed primarily on lower molecular weight olefins such as propylene which are known to be much more reactive in alkylation reactions than higher chain length olefinic materials.

When an unsaturated aliphatic acid is reacted with phenol according to the process of this invention, some esterification may occur as a side reaction between the hydroxy and carboxyl groups. This side reaction, however, is not unduly detrimental to the main alkylation reaction which proceeds unaffected. Any portion of the product in the ester form can be easily hydrolyzed to the free acid, if desired.

The present invention is based in part on the discovery that the yields of mono-alkylated product can be greatly improved by employing a large molar excess of the aromatic compound. The effectiveness of the process of this invention is especially outstanding in view of the use of the relatively high molecular weight unsaturated aliphatic compounds. The process of this invention has been found to greatly increase the yield of mono-alkylated product in a surprisingly short reaction time, making it feasible to adapt the process for continuous operation. It has also been discovered that the excess aromatic compound need not be wasted, but can readily be recovered and recycled through the process. Further, the hydrofluoric acid reaction medium can also be readily recovered and recycled through the process. These two features in combination with the high yields of mono-alkylated product obtained in a very short reaction time render the process especially well suited for commercial continuous process techniques.

In accordance with the present invention at least 2 moles of the aromatic compound should be employed per mole of the unsaturated aliphatic compound. Use of from about 2 to 10 moles of the aromatic compound per mole of the unsaturated aliphatic compound gives good results, however, it is preferred to use from about 2.5 to 6 moles of the aromatic per mole of the unsaturated compound. A large excess of more than 6 moles can be employed, but there does not appear to be any particular advantage.

It has been found that at least 2 moles of hydrofluoric acid should be employed per mole of unsaturated aliphatic compound, and preferably at least 3 moles of hydrofluoric acid per mole of aliphatic compound. It is preferred to use from about 3 to 15 moles of hydrofluoric acid per mole of unsaturated aliphatic compound, although a greater ratio of hydrofluoric acid can be used, up to 30 moles. However, there does not appear to be any particular advantage to employing more than 15 moles of hydrofluoric acid per mole of unsaturated aliphatic compound.

When the process of the present invention is practiced in the preferred manner, the desired reaction proceeds very rapidly. It has been found that the reaction is usually complete in less than 4 hours, and in many cases a much shorter time can be used. Under optimal conditions, the reaction proceeds to completion in less than 1 hour after the reactants are introduced into the hydrofluoric acid. For example, reaction times of from about 30 seconds to 30 minutes may be used. When the reaction is conducted between benzene and oleic acid, even at temperatures slightly below room temperature, a high yield of phenylstearic acid is formed in 30 seconds, and the reaction is substantially complete in from 2 to 5 minutes.

The reactants may be introduced separately or simultaneously into the hydrofluoric acid. For batch reactions, it will usually be most convenient to first introduce the aromatic compound, thereby assuring that a large excess of the aromatic compound is always in contact with the unsaturated compound. Therefore, the oleic acid or other unsaturated aliphatic compound can be gradually introduced while stirring the reaction mixtures. Such procedures will be further illustrated in specific examples. After completion of the reaction, the monoalkylated compound may be recovered in various ways. For example, the reaction mixture can be added to water, and the monoalkylated product extracted from the water into an organic solvent, such as ethyl ether or benzene. The ether and any excess of the aromatic compound can be stripped off by vacuum distillation, leaving the monoalkylated product.

In a preferred embodiment of the present invention, the hydrofluoric acid and the excess aromatic reactant are removed from the crude reaction product by distillation upon the completion of the reaction. The crude reaction product may be further purified, if desired, by distillation. When the excess aromatic reactant and hydrofluoric acid are removed by distillation, they can be condensed, and returned to the reaction vessel. This procedure is particularly desirable where a large excess of the aromatic reactant and hydrofluoric acid are employed.

The products of the process of this invention are useful as intermediates for further reaction such as ester formation, for use as plasticizers such as described in U.S. Pats. 2,443,450 and 2,396,715, or for copolymerization as described in U.S. Pat. 3,179,641; or the compounds may be used themselves for such uses as plasticizers as described in U.S. Pat. 2,476,264, and phenylstearic acid has been found especially useful as an emulsifier.

This invention is further illustrated by the following specific examples.

Example I

A 5-liter polyethylene beaker, equipped with a mechanical stirrer and thermocouple, was charged with 616 g. (30.8 moles) of liquid, anhydrous hydrogen fluoride at 0 to −5° C. About 300 g. (3.25 moles) of toluene were added to the hydrogen fluoride. A solution of oleic acid (800 g., 2.83 moles) in 850 g. (9.25 moles) toluene was then added to the reaction mixture at 5–15° C. over a 2–3 hour period with vigorous stirring. Stirring was continued for an additional hour; then the reaction mixture was poured into 8 liters of cold water. Four liters of ethyl ether were added, the organic layer separated and washed with one-liter portions of water until the washings were neutral. The ether and excess toluene were stripped off in vacuo to yield 1017.4 g. (96.0% of theory) of tolylstearic acid as a viscous amber oil.

*Analysis.*—Neut. equivalent, 365.0 (calcd. 374.6). Iodine value, 3.59.

Molecular distillation of the crude acid at 167–188° C./165–190$\mu$ afforded a 68% yield of pure tolylstearic acid. A fraction boiling at 199–251° C./0.5–7$\mu$, amounting to 10–12%, was also isolated corresponding to methyl phenylene distearic acid.

Example II

A 5-liter polyethylene beaker, equipped with a mechanical stirrer and thermocouple, was charged with 826 g. (41.3 moles) of liquid, anhydrous hydrogen fluoride at 0 to −5° C. About 200 g. (2.17 moles) of toluene was added to the hydrogen fluoride. A solution of tallow acid (929 g., 3.36 moles) in toluene (595 g., 6.45 moles) was then added to the reaction mixture at 5–15° C. over a period of 1–8 hours with vigorous stirring. Stirring was continued for one hour; then the reaction mixture was poured into 8 liters of cold water. Four liters of ether were added, the organic layer separated and washed with one-liter portions of water until the washings were neutral. The ether and excess toluene were stripped off in vacuo to yield 1060.7 g. of crude tolyltallow acid as a solid.

*Analysis.*—Neutralization equivalent, 317.6 (calc'd 332.5). Iodine value, 4.15.

Example III

A two-liter polypropylene beaker equipped with a magnetic stirrer and thermocouple was charged with 400 g. (20 moles) liquid, anhydrous hydrogen fluoride and 220 ml. (192 g., 2.47 moles) of benzene. A solution of commercial 9-octadecenyl nitrile (427 g., 1.62 moles) in benzene (5 ml., 440 g., 5.63 moles) was added over a one-hour period with stirring at 0–10° C. The reaction mixture was allowed to stir for an additional 45 minutes at 5–10° C., then poured into 8 liters of cold water. Ether (1.5–2 liters) was added and the aqueous layer separated. The organic layer was washed seven times with 300 ml. portions of water until the washings were neutral. The ether solution was then dried over anhydrous sodium sulfate and stripped in vacuo to yield 508.7 g. (92% mass yield) of an amber oil.

*Analysis.*—21% Monosubstituted amide (Infrared analysis). Gas chromatographic analysis (corrected for amide)

| | Percent |
|---|---|
| Phenylstearonitrile | 67 |
| Saturated starting nitriles | 11.9 |

Molecular distlilation of the crude nitrile at 138–153° C./47–75μ afforded a 58.5% yield of pure phenylstearonitrile.

Example IV

A one-liter Monel reactor was charged with 96 g. (4.8 moles) of liquid anhydrous hydrogen fluoride and 265 g. (2.88 moles) of toluene at 0–5° C. The reactor was sealed and the temperature of the reaction mixture was raised to 21° C. A solution of 270 g. (0.96 mole) commercial grade of oleic acid in 88 g. (0.957 mole) of toluene was pumped into the toluene-hydrogen fluoride mixture at a constant temperature of 21° C. over a period of 90 minutes. The reaction mixture was allowed to stir for an additional 30 minutes at 21° C. The reactor was fitted with a condenser and receiver and heat was applied. A continuous stream of $N_2$ was used as a carrier gas to aid in the distillation of the hydrogen fluoride and unreacted toluene. The temperature was raised gradually to 190° C., then the reaction mixture was cooled to yield 342 g. (97.2% mass yield) of a dark oil.

*Analysis.*—Neutralization equivalent, 373 (calc'd 374.6). Iodine value, 2.7. Percent HF, trace.

Distillation of the crude product resulted in three fractions:

| | Percent |
|---|---|
| Light ends (unsubstituted toluene) | 3.25 |
| Main fraction (primarily monoalkylated toluene-tolylstearic acid) | 83.5 |
| Residue (polymeric and dilakylated products) | 11.0 |
| Distillation losses | 2.25 |

Analysis of the main fraction by GLPC showed:

| | |
|---|---|
| Unreacted saturated acids (percent) | 3.6 |
| Tolylstearic acid (percent) | 96.3 |
| Neutralization equivalent | 373 |

Example V

Additional runs were made following the procedure set out in Example IV, but varying the mole ratio of the oleic acid, toluene, and hydrofluoric acid. The results of these tests are summarized in the following table:

TABLE A

| Reactants | | | Product | | | GLPC analysis of distillate | | |
|---|---|---|---|---|---|---|---|---|
| Oleic | Mole ratio toluene | HF | Neutralization equivalent | Iodine value | Percent residue | Percent distilled | Percent tolylstearic acid | Percent saturated acids |
| 1 | 1.1 | 3 | 382 | 8.9 | 33 | | | |
| 1 | 1.1 | 5 | 354 | 5.4 | 44.7 | 50.1 | 88.9 | 9.8 |
| 1 | 2 | 2 | 369 | 9.3 | 25.2 | | | |
| 1 | 2 | 5 | 387 | 3.6 | 22.7 | 70.4 | 93.8 | 5.8 |
| 1 | 2 | 11 | 368 | 3.4 | 16.7 | | | |
| 1 | 3 | 5 | | | 14.0 | 83.5 | 87.4 | 12.3 |
| 1 | 4 | 5 | 373 | 2.7 | 11 | 87.0 | 87.6 | 12.0 |
| 1 | 5 | 5 | 374 | 2.6 | 11.3 | 87.7 | 85.1 | 15 |
| 1 | 4.3 | 11 | 369 | 4.1 | 10 | | | |

In the foregoing table, the percent residue represents polymeric and dialkylated products, while the percent distilled represents monomeric acids. Thus a high distillate portion is desired. It is seen from the above table that when at least 2 moles of toluene per mole of oleic acid is used, the percent distillate is greatly increased. The chromatographic analysis of the distillate shows high yields of tolylstearic acid. The saturated acid component of the distillate represents saturated acids normally found in commercial oleic acid.

Example VI

A 5-liter polyethylene beaker, equipped with a mechanical stirrer, thermocouple, and addition funnel, was charged with 520 g. (25.9 moles) of liquid, anhydrous hydrogen fluoride and 279 g. (2.62 moles) of xylene at 0–5° C. A solution of 600 g. (2.1 moles) of oleic acid in 836 g. (7.88 moles) of xylene was added with stirring over 2 hours at 10–15° C. The reaction mixture was allowed to stir for an additional hour at 10–15° C., then poured into 6 liters of cold water. Two liters of ether were added and the aqueous phase separated. The organic layer was washed several times with salt water until the washings were neutral. The ether solution was dried over anhydrous sodium sulfate and stripped in vacuo to yield 846.1 g. of a viscous amber oil, xylyl-stearic acid, in almost quantitative yield.

*Analysis.*—Neutralization equivalent, 399 (calc'd 388.7). Saponification equivalent, 391. Iodine value, 1.64.

Example VII

A 4-liter polyethylene beaker equipped with a mechanical stirrer, thermocouple and addition funnel, was charged with 456 g. (22.75 moles) of liquid anhydrous hydrogen fluoride and 500 ml. (500 g., 4.62 moles) of anisole. A solution of oleic acid (523 g., 1.85 moles) in anisole (250 ml., 250 g., 2.3 moles) was added with stirring over a 90-minute period at 5–15° C. The reaction mixture was allowed to stir for an additional hour at 10–15° C., then poured into 8 liters of cold water. Ether (1.5–2 liters) was added and the aqueous phase separated. The organic layer was washed seven times with 300 ml. portions of water until the washings were neutral. The ether solution was then dried over anhydrous sodium sulfate and stripped in vacuo to yield 661.5 g. (91.6% mass yield) of a yellow, low melting solid.

*Analysis.*—Neutralization equivalent, 385.5 (calc'd 390.6). Infrared analysis indicated the material was the desired product.

Example VIII

A 2-liter polypropylene beaker, equipped with a mechanical stirrer, thermocouple, and addition funnel, was charged with 492 g. (24.6 moles) of liquid, anhydrous hydrogen fluoride and 82.0 g. (0.64 mole) of naphthalene. The mixture was warmed to 16° C. and a warm solution of oleic acid (137 g., 0.5 mole) and naphthalene (123 g., 0.95 mole) was added with stirring over a 45-minute period at 16–18° C. The addition funnel was then rinsed with 25 ml. of ether and the ether added to the reaction mixture. Stirring was continued for one hour at 16–18° C. after the addition was completed. The reaction mixture was then poured into 8 liters of cold water. Ether (1.5–2 liters) was added and the aqueous phase separated. The organic layer was washed several times with 300 ml. portions of water until the washings were neutral. The ether solution was then dried over anhydrous sodium sulfate and stripped under reduced pressure. Excess naphthalene was removed by sublimation in vacuo. Crude naphthylstearic acid was isolated as a viscous amber oil, 177.7 g. (88.4% mass yield).

*Analysis.*—Neutralization equivalent 365.5 (calc'd 402). Saponification equivalent 368. Iodine value 6.28.

Example IX

A 300 ml. Monel autoclave was charged with 45 g. (2.25 moles) of liquid, anhydrous hydrogen fluoride and 66.6 ml. (59.0 g., 0.75 mole) of benzene at 0° C. The reactor was sealed and the temperature of the reaction mixture raised to 30° C. Molten erucic acid (50.8 g., 59.2 ml., 0.15 mole) was pumped into the hydrogen fluoride-benzene mixture at 25–30° C. over a 20–25 minute period. The reaction mixture was allowed to stir for an additional 30 minutes at 25–30° C., then poured into one liter of cold water. One liter of ether was added and aqueous phase separated. The organic layer was washed seven times with 250 ml. portions of salt water. The ether solution was dried over anhydrous sodium sulfate and stripped in vacuo to yield 69.9 g. (98.9% mass yield) of a dark viscous oil.

*Analysis.*—Neutralization equivalent, 407 (calc'd 416.7). Iodine value, 4.0.

Example X

A 300 ml. Monel autoclave was charged with 40 g. (2.0 moles) of liquid, anhydrous hydrogen fluoride and 29 ml. (25.4 g., 0.327 mole) of benzene at 13° C. A solution of 36.9 g. (0.20 mole) of 10-undecenoic acid in 60 ml. (52.6 g., 0.673 mole) of benzene was added with stirring over a 30–35 minute period at 13–18° C. The reaction mixture was allowed to stir for an additional 30 minutes at 14–18° C., then poured into one liter of cold water. Ether was added and the aqueous phase separated. The organic layer was washed six times with 250 ml. portions of salt water. The ether solution was dried over anhydrous sodium sulfate and stripped in vacuo to yield 55.3 g. of dark, viscous oil in almost quantitative yield.

*Analysis.*—Neutralization equivalent, 256.5 (calc'd 262.4).

Example XI

A 1000 ml. Monel autoclave was charged with 180 g. (9.0 moles) of liquid, anhydrous hydrogen fluoride and 200 ml. (176 g., 2.25 moles) of benzene at 0° C. The reactor was sealed and the temperature of the reaction mixture raised to 15° C. A solution of castor oil (280 g., 0.3 mole) in 200 ml. (176 g., 2.25 moles) of benzene was pumped into the benzene-hydrogen fluoride mixture at 15–22° C. over a 130-minute period. The reaction mixture was allowed to stir for an additional 86 minutes at 7–20° C., then poured into 1.5–2 liters of cold water. Two liters of benzene were added and the aqueous phase separated. The organic layer was washed four times with 250 ml. portions of salt water. The benzene solution was dried over anhydrous sodium sulfate and stripped in vacuo to yield 322.0 g. (92.0% mass yield) of a light brown, viscous oli.

*Analysis.*—Saponification equivalent, 373.8 (calc'd 389). Iodine value, 13.7. Infrared analysis indicated the material to be primarily the triglyceride of phenyl hydroxystearic acid.

Example XII

A 300 ml. Monel autoclave was charged with 56.5 g. (2.83 moles) of liquid, anhydrous hydrogen fluoride and 75.6 ml. (66.4 g., 0.85 mole) of benzene at 5° C. The reactor was sealed and the temperature of the reaction mixture raised to 14° C. Tall oil fatty acid (56.4 g., 0.2 mole) in 50 ml. (44 g., 0.564 mole) of benzene was pumped into the benzene-hydrogen fluoride mixture at 11–21° C. over a 50-minute period. The reaction mixture was allowed to stir for an additional 30 minutes at 20–25° C., then poured into one liter of cold water. One liter of ether was added and the aqueous phase separated. The organic layer was washed eight times with 250 ml. portions of salt water. The ether solution was dried over anhydrous sodium sulfate and stripped in vacuo to yield 68.3 g. (95% mass yield) of brown, viscous oil.

*Analysis.*—Neutralization equivalent, 361 (calc'd 360). Iodine value, 30.6.

Example XIII

A 300 ml. Monel stirred autoclave was charged with 40 g. (2.0 moles) of liquid, anhydrous hydrogen fluoride and 60 ml. (52.8 g., 0.68 mole) of benzene at 7 ° C. The reactor was sealed and a solution of 55.9 g. (0.204) of 9-octadecenyl amine in 30 ml. (26.4 g., 0.34 mole) of benzene pumped into the reaction mixture at 7–16° C. over a 30–35 minute period. The reaction mixture was allowed to stir for an additional 30 minutes at 15–22° C., then poured into 2 liters of cold water. The aqueous solution was made alkaline (pH 10) with KOH and one liter of ether added. The aqueous phase was separated and the organic layer washed four times with salt water. The ether solution was dried over anhydrous sodium sulfate and stripped in vacuo to yield 65.1 g. (92.5% mass yield) of phenyloctadecylamine as a yellow oil.

*Analysis.*—Neutralization equivalent, 334 (calc'd 345.6). Iodine value, 4.8.

Example XIV

A 300 ml. Monel stirred autoclave was charged with 40 g. (2 moles) of anhydrous, liquid hydrogen fluoride and 94.1 g. (1 mole) of phenol at 8° C. The reactor was sealed and 56.5 g. (0.2 mole) of commercial oleic acid was pumped into the reaction mixture at 4–8° C. over a 30–35 minute period. The reaction mixture was allowed to stir for an additional 15 minutes at 4–6° C., then poured into 1–1.5 liters of cold water. One liter of ether was added and the aqueous phase separated. The organic layer was washed six times with 250 ml. portions of salt water and dried over anhydrous sodium sulfate. The ether solution was then stripped in vacuo to yield 73.3 g. (97.4% mass yield) of a light amber, viscous oil.

*Analysis.*—Neutralization equivalent, 463 (calc'd 376.6). Saponification equivalent, 373.

The crude hydroxyphenylstearic acid, described above, was subjected to hydrolysis in a refluxing alcoholic solution of potassium hydroxide. The completely saponified acid was isolated as an amber viscous oil in 90.3% yield having the following analysis: Neutralization equivalent, 350 (calc'd 376.6).

Example XV

A series of reactions using red oil, benzene, and hydrofluoric acid in the mole ratio of 1:4:8 was conducted to ascertain completeness of the reaction at various reaction times. The red oil used is known commercially as black red oil and has the following analysis:

N.E. _____ 304.3
Saponification equivalent _____ 285
I.V. _____ 87.3 and is a mixture of oleic acid, saturated acids $C_{16}$ and $C_{18}$, and some ester, probably as a partial glyceride. The material is predominantly oleic acid. The reaction was carried out in plastic bottles, stirred with a mechanical stirrer, and the bottles maintained in a water bath. Holes were drilled in the upper part of the side of the plastic bottles so that one reactant could be added to the other with a syringe. The red oil and benzene were mixed in the bottle and the hydrofluoric acid injected with a syringe into the mixture, the hydrofluoric acid injection being completed in 3 to 4 seconds. The initial temperature was 20° C. and an exotherm of from 10 to 16° C. was observed. The reaction was stopped after predetermined times by adding 20 ml. of cold water. The product was analyzed by thin layer chromographic and gas chromographic techniques, the results being shown in Table B.

TABLE B

| Reaction time in minutes | Crude mass yield, percent | TLC | | | GC, Percent $C_{18}$ alkylated benzene |
| | | Percent mono-acid | Percent dimer | Percent remaining at origin | |
| --- | --- | --- | --- | --- | --- |
| 15 | 86.3 | 85 | 12 | 3 | 82.1 |
| 10 | 79.1 | 85 | 12 | 3 | 77.9 |
| 5 | 88.3 | 85 | 12 | 3 | 80.5 |
| 2½ | 85.8 | 85 | 12 | 3 | 78.3 |
| 1 | 91.9 | 88 | 10 | 2 | 64.0 |
| 0.5 | 84.8 | 90 | 8 | 2 | 54.5 |

It is seen from the above table that the reaction is substantially complete in 2.5 minutes, and a large amount of alkylated benzene product is present in as little as 30 seconds.

Example XVI

A reaction using commercial oleic acid, benzene and hydrofluoric acid in the mole ratio of 1:4.27:8.54 was conducted in a 300 ml. autoclave with an initial temperature of 80° C. The hydrofluoric acid and benzene were added to the autoclave and oleic acid added by pressure in less than 10 seconds. The reaction was stopped 30 seconds after addition of oleic acid and the product was analyzed in the same manner as described in Example XV.

| | Percent |
|---|---|
| Crude mass yield | 94.3 |
| TLC: | |
| Mono acid | 82 |
| Dimer | 15 |
| Remaining at origin | 3 |
| GC, $C_{18}$ alkylated benzene | 84.6 |

This reaction shows the high yield of mono-alkylated benzene obtained in as short a reaction time as 30 seconds.

Example XVII

A 600 ml. polyethylene beaker was charged with 100 gms. (5.0 moles) of liquid hydrogen fluoride at about 5° C. and 72 ml. (63.2 g., 0.81 mole) of benzene added. A solution of 49.0 g. (0.162 mole) of methyl oleate in 72 ml. (63.2 g., 0.81 mole) of benzene was then added with stirring over a 55 minute period at 8–13° C. Stirring was continued for an additional 50 minutes at 12–20° C. The reaction mixture was then poured into 1500 ml. of cold water. Ether (1000 ml.) was added and the aqueous layer separated. The ether solution was washed twice with water, then dried over anhydrous sodium sulfate. The ether was removed under reduced pressure to yield 56.1 g. (93.6% crude mass yield) of yellow oil having the following analysis: Acid value, 6.45. Saponification equivalent, 358.5 (calc'd 374.6).

Example XVIII

Methylhydroxyphenylstearic acid was produced in the following manner. A one gallon polyethylene vessel was charged with 994 gms. (49.7 moles) of liquid hydrogen fluoride in 536.5 gms. (4.97 moles) of p-cresol at about 0° C. Oleic acid (467 gms., 1.66 moles) was added with stirring over a 30 minute period at 0–3° C. The reaction mixture was stirred for an additional 15 minutes and then approximately two liters of cold water was added at 0–5° C. 1000 ml. of ether was added and the acidic aqueous phase separated. The ether solution was washed several times with water and the solvent removed under reduced pressure. A major portion of the p-cresol was removed at 135° C./1–2 mm. yielding 627.9 gms. of a viscous, amber oil as the crude product. Analysis of the crude product, containing some residual p-cresol, was as follows: Neutralization equivalent, 1094 (calc'd 390). Saponification equivalent, 406.

A sample of the crude product was saponified to liberate the free acid from the cresyl ester,

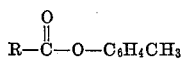

which formed during the stripping operation. The product was primarily methylhydroxyphenylstearic acid having a neutralization equivalent of 448 (calc'd 390).

Example XIX

A 300 ml. Monel autoclave was charged with 30.6 gms. (1.53 moles) of liquid hydrogen fluoride at 0–5° C. A solution of Empol 1018 (36.55 gms., 0.06 mole) in benzene (58.65 gms., 0.753 mole) was added in about one minute at 22° C. Empol 1018 is a technical grade dimer acid obtained from Emery Industries which contains about 78% $C_{36}$ dimer acid produced by polymerization of $C_{18}$ fatty acid and an approximate molecular weight of 565, 17% $C_{54}$ trimer acid produced by polymerization of $C_{18}$ fatty acid and a molecular weight of approximately 850, and 5% monobasic acids; and has an I.V. of 130.3. The reaction mixture was stirred for about 30 minutes following which it was poured into about 1 liter of cold water. 1000 ml. of ether was added and the acidic aqueous layer separated. The ether solution was washed several times with water, dried over anhydrous sodium sulfate and stripped under reduced pressure to yield 38.0 gms. (91.4% crude mass yield) of an amber, viscous oil. Infrared analysis showed about 30 to 40% of product was mono-alkylated benzene, based on a $C_{36}$ diacid mono-alkylated benzene.

Example XX

A polyethylene vessel, equipped with a mechanical stirrer, thermocouple and addition funnel, was charged with 2350 grams (117.5 moles) of liquid hydrogen fluoride and 664 grams (3.91 moles) of diphenyl ether at 4 to 6° C. A solution of oleic acid (1650 grams, 5.88 moles) in 3336 grams (19.6 moles) of diphenyl ether was added, with stirring over a period of 143 minutes at 0 to 10° C. The reaction mixture was stirred for an additional 30 minutes at 10 to 11° C. and then cooled to about 0° C. Six liters of water was then added, with cooling over a 40 minute period at 0 to 28° C. The acidic aqueous layer was separated and the organic layer washed several times with hot salt water. Excess diphenylether was removed at 85 to 155° C./0.1 to 0.6 mm. The crude phenoxyphenylstearic acid was isolated as a yellow, viscous oil, 2485.5 grams (93.5% crude mass yield), having the following analysis: Neutralization equivalent, 473 (calc'd 452.7). I.V., 6.2.

While in the foregoing specification this invention has been described in relation to certain preferred embodiments theerof, and many details have been set forth for purpose of illustration, it will be apparent to those skilled in the art that the invention is susceptible to additional embodiments and that certain of the details described herein can be varied considerably without departing from the basic principles of the invention.

We claim:

1. In the process of mono-alkylation of aromatic compounds with olefinic compounds to obtain a high yield of mono-alkylated product the improvement comprising, mixing
   (A) a compound selected from the group consisting of aliphatic hydrocarbon mono- and di-olefinic compounds having carbon chains of 8 to 22 carbon atoms and a substituent selected from the group consisting of carboxy, carboalkoxy, hydroxy, alkoxy, amino, cyano and carbamyl, and dimers and trimers thereof
   (B) 2 to 10 moles, on the basis of said olefinic compound, of an aromatic compound selected from the group consisting of mono-, di- and tri-carbocyclic compounds and their substituted derivatives wherein said substitution is 1 to 2 radicals selected from the group consisting of methyl, methoxy, phenoxy, and hydroxy, and
   (C) 2 to 30 moles, on the basis of said olefinic compound, of liquid hydrofluoric acid,
   and reacting the mixture at about −20° C. to 100° C. for about one-half minute to four hours, until substantially all of said olefinic compound has reacted.

2. The process of claim 1 wherein said aromatic compound is added in the proportion of from about 2.5 to 6 moles of said aromatic compound per mole of said aliphatic compound.

3. The process of claim 1 wherein said hydrofluoric acid is present in an amount from about 3 to 15 moles per mole of said aliphatic compound.

4. The process of claim 1 wherein said aliphatic compound is a monomeric compound having from 8 to 22 carbon atoms.

5. The process of claim 1 wherein said aliphatic compound is selected from the group consisting of oleic acid, erucic acid, 9-octadecenylamine, unhydrogenated tallow, and castor oil.

6. The process of claim 1 wherein said aliphatic compound is oleic acid and said aromatic compound is selected from the group consisting of benzene and benzene substituted with from 1 to 2 radicals selected from the group consisting of methyl, methoxy, phenoxy, and hydroxy.

7. The process of claim 1 wherein said aliphatic compound is oleic acid and said aromatic compound is selected from the group consisting of naphthalene and naphthalene substituted with from 1 to 2 radicals selected from the group consisting of methyl, methoxy, phenoxy, and hydroxy.

8. The process of claim 1 wherein said aliphatic compound is selected from the group consisting of dimeric and trimeric compounds having from 22 to 54 carbon atoms.

9. The process of claim 1 wherein said aliphatic compound is selected from dimeric and trimeric acids derived from the group consisting of oleic acid and tall oil acids.

10. In the process of mono-alkylation of aromatic compounds with olefinic compounds to obtain a high yield of mono-alkylated product the improvement comprising, mixing (A) A compound selected from the group consisting of aliphatic hydrocarbon mono- and di-olefinic compounds having carbon chains of 8 to 22 carbon atoms and a substituent selected from the group consisting of carboxy, carboalkoxy, hydroxy, alkoxy, amino, cyano and carbamyl, and dimers and trimers thereof (B) 2 to 10 moles, on the basis of said olefinic compound, of an aromatic compound selected from the group consisting of mono-, di- and tri-carbocyclic compounds and their substituted derivatives wherein said substitution is 1 to 2 radicals selected from the group consisting of methyl, methoxy, phenoxy, and hydroxy, and (C) 2 to 30 moles, on the basis of said olefinic compound, of liquid hydrofluoric acid, and reacting the mixture at about −20° C. to 100° C. for about one-half minute to four hours, until substantially all of said olefinic compound has reacted, and thereafter distilling off said hydrofluoric acid and unreacted excess of said aromatic compound, whereby the hydrofluoric acid and excess aromatic compound are recovered and reused in the process.

11. An improved process for the production of phenylstearic acid comprising mixing oleic acid, benzene, and 2 to 30 moles on the basis of said oleic acid of liquid hydrofluoric acid, said benzene being added in the proportion of 2 to 10 moles per mole of oleic acid, and reacting the mixture at from −20° C. to 100° C. for a time of about one-half minute to 4 hours to produce a high yield of phenylstearic acid.

12. The process of claim 11 wherein said reaction is carried out for a period of about one-half minute to 5 minutes.

References Cited

UNITED STATES PATENTS 2,275,312   3/1942   Tinker et al. _____ 260—515

OTHER REFERENCES

Calcott, et al., "J.A.C.S." vol. 61 (1939) pp. 1010–15.

ALEX MAZEL, Primary Examiner

J. H. TURNIPSEED, Assistant Examiner

U.S. Cl. X.R.

117—161; 260—85.5, 87.1, 88.7, 89.7, 91.1, 398, 400, 404, 410, 410.5, 410.7, 410.9, 465, 551, 563, 570.8, 671